United States Patent [19]

Sugiura

[11] Patent Number: 5,436,883
[45] Date of Patent: Jul. 25, 1995

[54] RECORDING MEDIUM AND INFORMATION RECORDING AND REPRODUCING APPARATUS THEREFOR

[75] Inventor: Satoshi Sugiura, Tokorozawa, Japan

[73] Assignee: Pioneer Electronic Corporation, Tokyo, Japan

[21] Appl. No.: 217,563

[22] Filed: Mar. 25, 1994

Related U.S. Application Data

[62] Division of Ser. No. 4,252, Jan. 14, 1993, Pat. No. 5,331,626.

Foreign Application Priority Data

Jan. 20, 1992 [JP] Japan ................................ 4-7837

[51] Int. Cl.$^6$ .............................................. G11B 7/135
[52] U.S. Cl. ....................................... 369/109; 369/112
[58] Field of Search .................. 369/109, 110, 112, 99, 369/44.25, 44.21, 44.22, 44.23, 44.37; 250/205.1

[56] References Cited

U.S. PATENT DOCUMENTS 5,251,196 10/1993 Morimoto et al. ................... 369/110
5,329,517  7/1994 Yamaguchi et al. ................. 369/110

Primary Examiner—Paul M. Dzierzynski
Assistant Examiner—Don Wong
Attorney, Agent, or Firm—Sughrue, Mion, Zinn, Macpeak & Seas; Richard C. Turner; Stephen M. Gruskin

[57] ABSTRACT

A recording medium from which recorded information is reproduced by irradiating a read-out light, including an information recording surface and a plurality of information recording surface and a plurality of information pits formed on the information recording surface. The information pits are formed by fine diffraction gratings having a grating constant (d) less than one half of the wavelength ($\lambda$) of the read-out light. The free diffraction gratings have a plurality of grating directions, each of the plurality of grating directions corresponding to the information to be recorded.

4 Claims, 15 Drawing Sheets

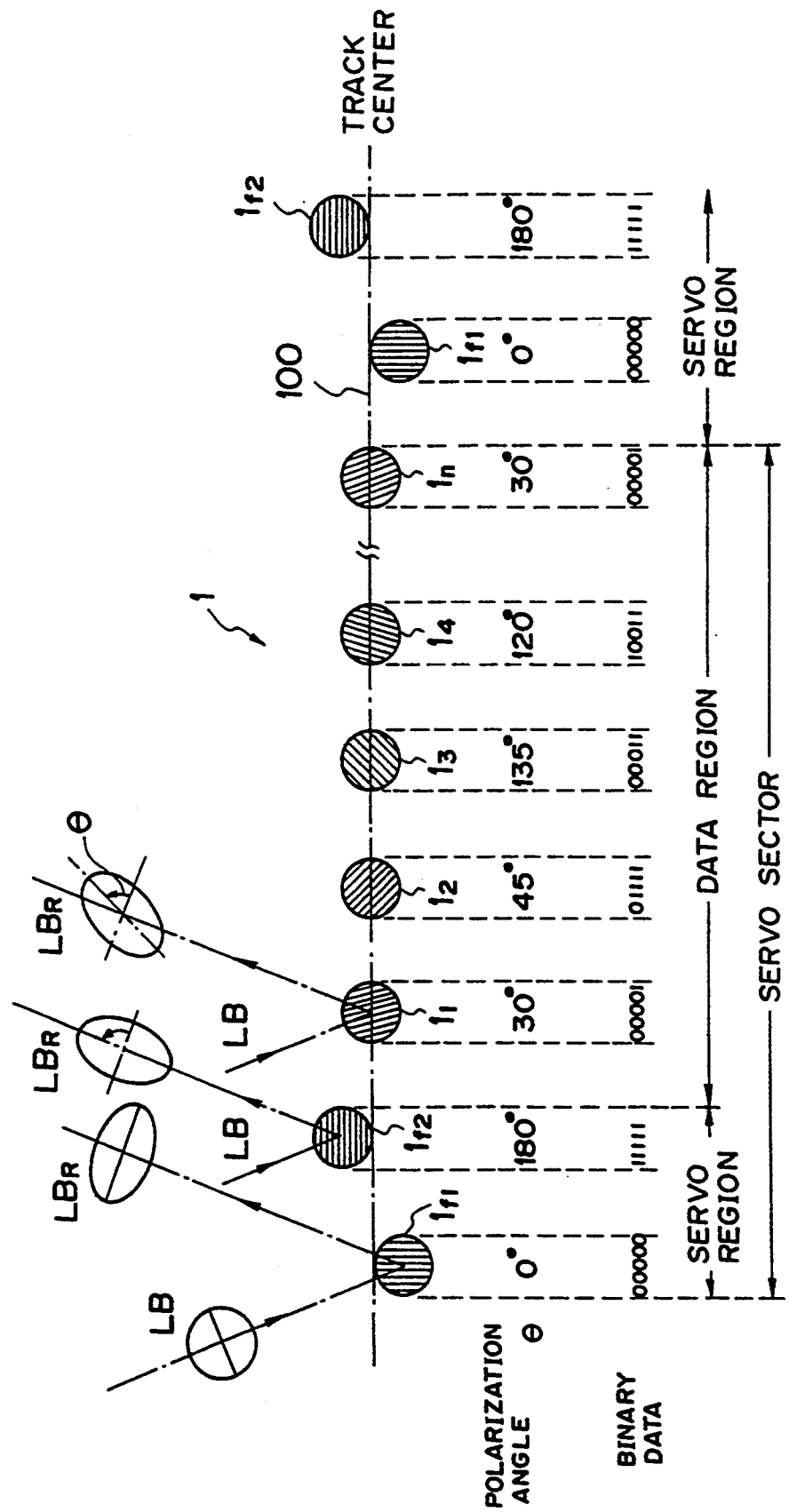

F I G. 12
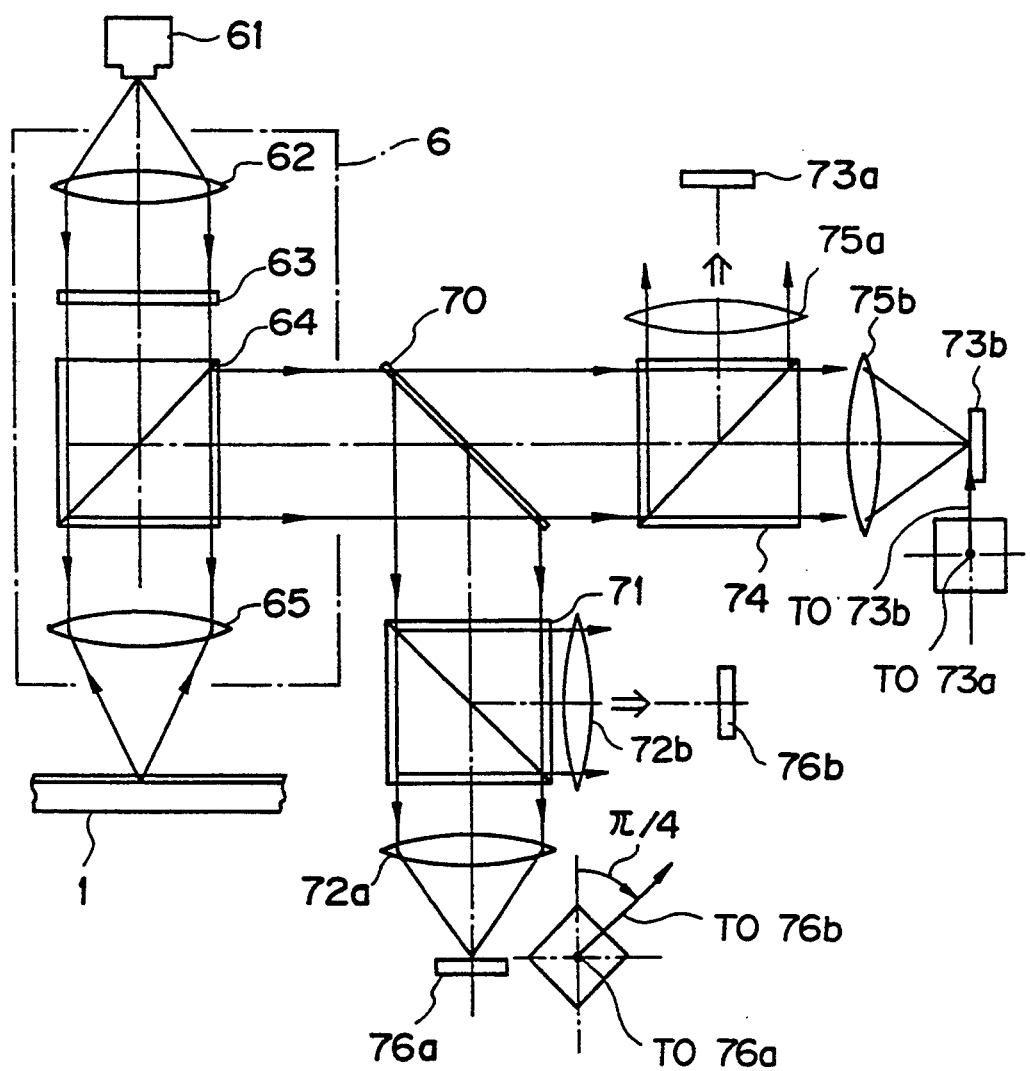

F I G. 13
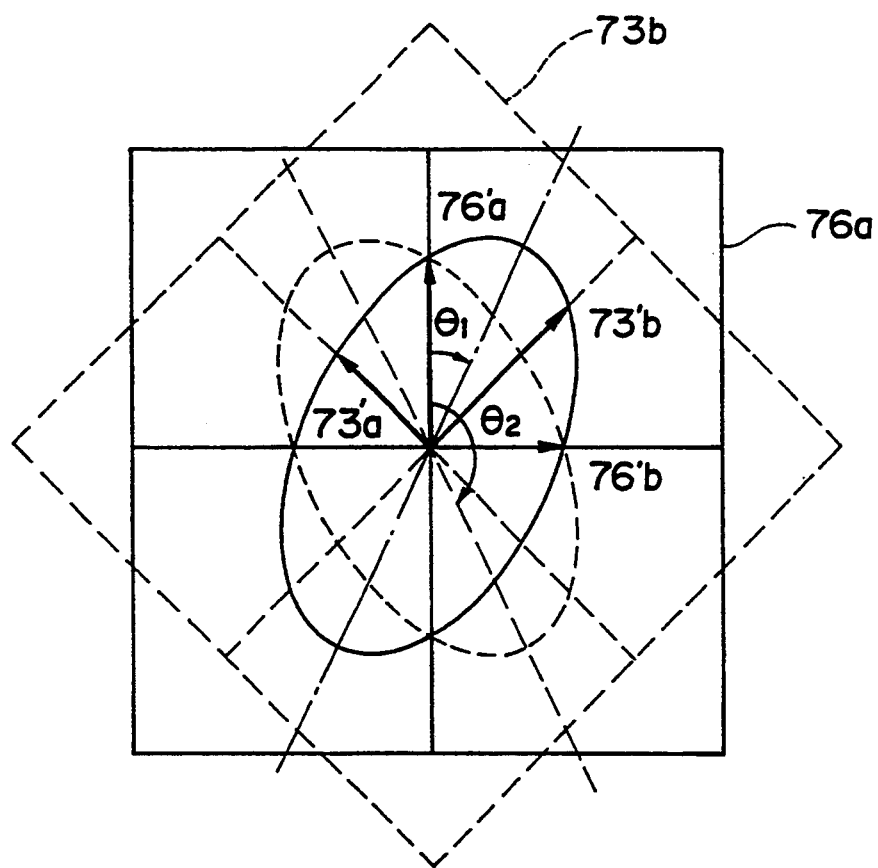

RECORDING MEDIUM AND INFORMATION RECORDING AND REPRODUCING APPARATUS THEREFOR

This is a divisional of application No. 08/004,252 filed Jan. 14, 1993, now U.S. Pat. No. 5,331,626.

BACKGROUND OF THE INVENTION

1. Field of the Invention

This invention relates to a recording medium for optically recording signals of various information such as video information and apparatus for optically recording and reproducing information thereon and therefrom. And more particularly to a recording medium on which information can be recorded at high density, and recording/reproducing apparatuses therefor.

2. Description of the Prior Art

Generally, a recording medium is formed as a recording disc which includes a center hole at its central portion, and information are recorded as a single track in a spiral form surrounding the outer periphery of the center hole. Such a recording disc includes, as shown in FIG. 1A, information pit portion 10 formed on a transparent disc substrate or base 15 such as Polymethyl methacrylate (PMMA), an aluminum film 12 of a high reflection factor laminated on the disc substrate 15 which is provided with the information pit portion 10 thereon, and a protective layer 11 such as plastic formed on the aluminum film 12.

In the case of reproducing information from the recording disc, a light beam LB such as laser beam is irradiated from the transparent disc substrate 15 side onto information pit portion 10 of a track section to be reproduced. As a result, as shown in FIG. 15B, rays of reflected light $LB_R$ reflected at mirror-finished surface portions between pits where no information pit portion 10 exists are detected as a "bright" light, and rays of reflected light $LB_R$ reflected at the portion of information pit portion 10 are detected as a "dark" light. In this way, information corresponding to respective recording pits 20a, 20b, 21, . . . of the information pit portions 10 will be reproduced by rays of reflected light of "bright" or "dark" light.

According to the recording disc and the reproducing method as described above, rays of reflected light are detected as a signal light optically amplitude-modulated by a change in the reflection factor of a light beam of a read-out light emitted onto the information pit portions. As a result, binary signals are recorded and reproduced in correspondence with the obtained signal light of "bright" or "dark". Since information is merely recorded as a binary signal of one bit in a manner of the presence or absence of information pits as described above, there is a limit in the information integration density per unit area of the disc. For this reason, there was the problem that it is difficult to increase the information integration density to be high. Further, even if information is recorded at high density by using any other recording method such as reducing the track pitch, etc., it was difficult to precisely reproduce the recorded information because the light beam is simultaneously irradiated on the adjacent information pits as shown in FIG. 1C.

As a technology to solve the above-mentioned problem, there is a recording carrier (recording medium) disclosed in the Japanese Patent Application Laid Open No. 119517/1975. In this recording medium, at least two kinds of diffraction gratings are provided in areas arranged in a track form so that directions of the grating lines are different for every kinds of diffraction gratings. That is, if the two kinds of diffraction gratings are alternately formed on every adjacent tracks, adjacent tracks positioned on both the sizes of the target track are formed by the diffraction grating of other kind than that of the target track and serves as an intermediate zone at the time of reading the target track. Therefore, information recording density becomes substantially twice greater than that of an ordinary recording medium.

However, in the case of the above-mentioned recording carrier, since the content of information is recorded by means of plural kinds of diffraction gratings, the diffraction directions are different for every kinds of the diffraction gratings at the time of reproduction. For this reason, there is the problem that it is necessary to provide a plurality of signal light detection units for each kind of diffraction directions.

SUMMARY OF THE INVENTION

It is an object of this invention to provide a recording medium on which information can be record at a high density, and recording and reproducing apparatuses for such recording medium.

According to one aspect of the present invention, there is provided a recording medium from which recorded information is reproduced by irradiating a read-out light, including: an information recording surface, and a plurality of information pits formed on the information recording surface, the information pits being formed by fine diffraction gratings having a grating constant (d) less than one half of the wavelength ($\lambda$) of the read-out light, the fine diffraction gratings having a plurality of grating directions, each of the plurality of grating directions corresponding to the information to be recorded.

Accordingly, it has become possible to make a plurality of information in the same pit region of information pits. Thus, high density integration of information can be made.

According to another aspect of the present invention, there is provided an information recording apparatus for recording information on an information recording medium as information pits corresponding to the information, the recorded information being read out by irradiating a read-out light onto the recording medium, the apparatus including: reference light emitting device for emitting two coherent rays of reference lights on a lighting region of the recording medium in a manner that the two coherent rays overlap with each other so as to form an interference fringe having direction corresponding to information to be recorded, the lighting region being broader than a pit region where an information pit is formed, bias light emitting device for emitting a bias light incoherent with respect to the rays of reference lights on a region of the recording medium substantially equal to the pit region in a manner that the bias light is superimposed on the rays of reference lights, and information pit forming device for forming information pits of fine diffraction gratings on the pit region by exposure of the interference fringe, the information pit forming device forming the information pits at an area in the pit region where total light intensity of the reference lights and the bias light exceeds a recording threshold intensity of the recording medium.

According to still another aspect of the present invention, there is provided an information recording method for recording information onto information recording medium, the recorded information being read out by irradiating a read-out light onto the recording medium, the method including the steps of: emitting two coherent rays of reference lights on a lighting region of the recording medium in a manner that the two coherent rays overlap with each other so as to form an interference fringe having direction corresponding to information to be recorded, the lighting region being broader than a pit region where an information pit is formed, emitting a bias light incoherent with respect to the rays of reference lights on a region of the recording medium substantially equal to the pit region in a manner that the bias light is superimposed on the rays of reference lights, and forming information pits of fine diffraction gratings on the pit region by exposure of the interference fringe, the information pit forming device forming the information pits at an area in the pit region where total light intensity of the reference lights and the bias light exceeds a recording threshold intensity of the recording medium.

Therefore, fine diffraction gratings of information pits as a plurality of information in the same region are formed in a specific region at a high density and with high accuracy.

According to still another aspect of the present invention, there is provided an information reproducing apparatus for reproducing recorded information from a recording medium on which information pits formed by fine diffraction gratings having a grating constant (d) of an interval less than one half of the wavelength ($\lambda$) of the read-out light, including: a light source for emitting a read-out light, an optical system for irradiating the read-out light emitted from the light source onto the recording medium and for guiding a signal light double-refracted from the recording medium into a direction different from the optical path of the read-out light, branching device for branching the signal light guided into the optical path into two rays of signal lights, a first polarization beam splitter for receiving one of the signals branched by the branch device and splitting the received signal into two polarized light components, a second polarization beam splitter whose optical axis inclined by a predetermined angle with respect to the optical axis of the first polarization beam splitter, for receiving the other one of the signals branched by the branch device and splitting the received signal into two polarized light components, and first to fourth photodetectors for receiving rays of the signal light branched by the first and second polarization beam splitters and outputting reproduced signals.

Accordingly, it is possible to precisely reproduce information from the recording medium on which information is recorded at a high density.

BRIEF DESCRIPTION OF DRAWINGS

FIGS. 2 is an enlarged view of a servo sector of a recording medium according to an embodiment of this invention.

FIG. 12 is a diagram showing a reproducing system of an information reproducing apparatus for a recording medium according to an embodiment of this invention.

FIG. 13 is a diagram showing elliptically polarized states of rays of signal lights outputted from respective beam splitters in the optical pick-up shown in FIG. 12.

DESCRIPTION OF THE PREFERRED EMBODIMENTS

Recording Medium

Figure 1A:
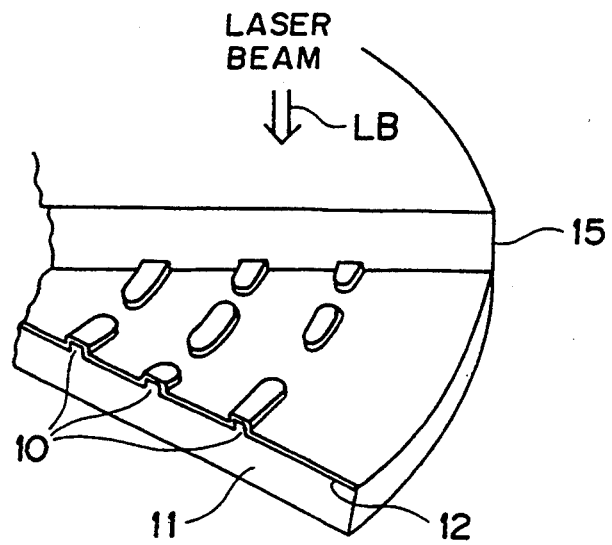
FIGS. 1A–1C are partially enlarged views of an information recording medium.
Figure 1B:
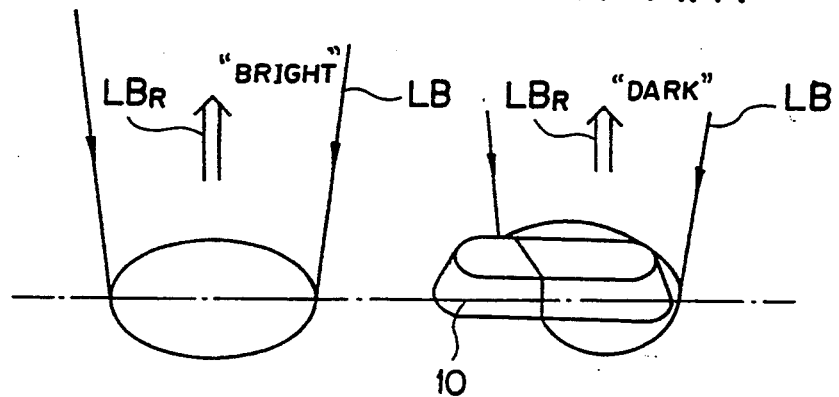
Figure 1C:
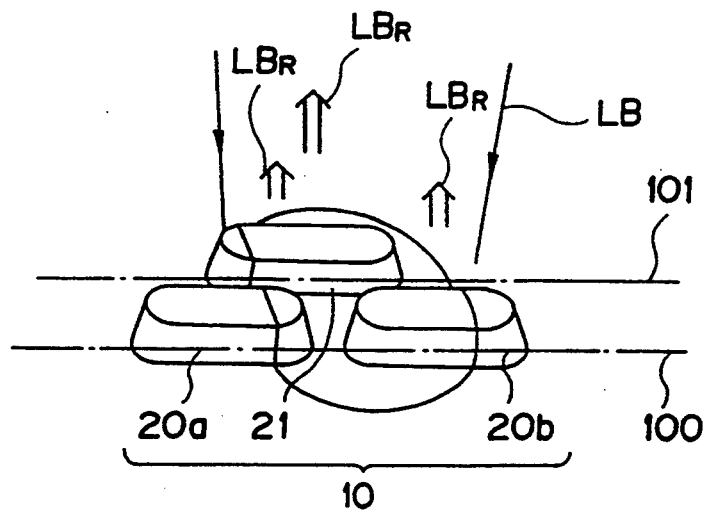

A recording medium according to this embodiment will now be described with reference to FIG. 2. FIG. 2 is an enlarged view of a servo sector of the recording medium. As seen from FIG. 2, the recording medium according to this embodiment has such a structure that information pit portions formed by pit regions of fine diffraction gratings having a grating constant d less than one half of a wavelength k of read-out laser beam LB for reproduction of information are arranged as a single track 100 on a disc substrate. Each information pit portion 1 includes a servo region formed by format pits $1_{f1}$, $1_{f2}$ whose grating directions of the fine diffraction gratings are perpendicular to or parallel to the track 100 direction, and a data region formed by a plurality of information pits where the grating direction of the fine diffraction gratings are shifted by arbitrary predetermined angles with respect to the grating directions of the format pits $1_{f1}$, $1_{f2}$.

Since the format pits $1_{f1}$, $1_{f2}$ and information pits $1_1 \sim 1_n$ of the information pit portion 1 form pit regions by fine diffraction gratings having a grating constant less than one half of the wavelength $\lambda$ of the read-out laser beam LB, in the case where the read-out laser beam LB is emitted, a signal light emitted from the information pit portion 1 has a birefringence (double refraction) property, and no diffracted light of the high order exists, resulting in only diffraction of light of the zero-th order. Such a peculiar phenomenon is described in a paper "Submicrometer periodicity grating as artificial anisotropic dielectrics" in pages 492–494 of Appl. Phys. Lett., Vol. 42, No. 6, issued on Mar. 15, 1983.

A single servo sector includes the servo region and the data region, and a plurality of servo sectors are formed in succession to form a spiral single track 100 on an optical disc.

The reproducing operation of the recording medium constructed as above will now be described.

First, a circularly polarized read-out laser beam LB is emitted onto the recording surface of the optical disc in a focus-in (focused) state. The read-out laser beam LB is emitted as an elliptically polarized light by format pits $1_{f1}$, $1_{f2}$ of the servo region. Namely, as shown in FIG. 2, a signal light $LB_R$ of the read-out laser beam LB reflected from the format pit $1_{f1}$ is emitted in a manner that the major axis of the elliptically polarized light takes an angle of zero degree with respect to the track direction. Further, a signal light $LB_R$ reflected from the format pit $1_{f2}$ is emitted in a manner that the major axis of the elliptically polarized light is rotated by 90 degrees with respect to the track direction. From the elliptically polarized lights $LB_R$ emitted from the format pits $1_{f1}$ and $1_{f2}$, reference polarized light major axes are detected. These reference polarized light major axes serve as reference signals of the signal light $LB_R$ in the servo sector. In addition, since the format pits $1_{f1}$, $1_{f2}$ are arranged being deviated from the track center in both size thereof, tracking error signal can be obtained by the track Wobbled mark method in which track error signal is produced by detecting a quantity of deviation of the signal light $LB_R$ with respect to the track center in the servo sector.

The read-out laser beam LB is irradiated in succession on information pits $1_1 \sim 1_n$ in the data region subsequently to the irradiation on the format pits $1_{f1}$, $1_{f2}$. The read out laser beams diffracted by the information pits $1_1 \sim 1_n$ are detected as signal lights $LB_R$ each having elliptically polarized light axis angles $\Theta$ corresponding to the grating directions of fine diffraction gratings forming these information pits $1_1 \sim 1_n$. These elliptically polarized light axis angles $\Theta$ of signal light $LB_R$ are successively detected in the same servo sector by using the polarized light axis of the signal light from the formal pits $1_{f1}$, $1_{f2}$ as a reference. Binary data corresponding to respective elliptically polarized axis angle $\Theta$ are set in advance. Information of the optical disc are reproduced as those binary data.

Figure 3A:
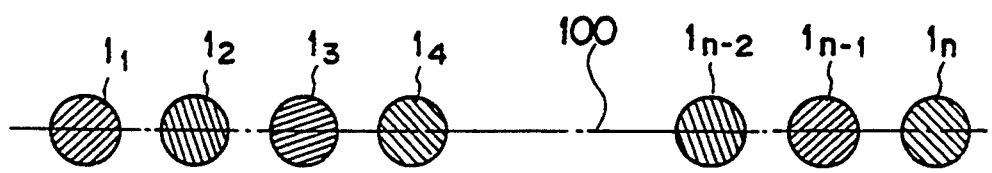
FIGS. 3A and 3B are enlarged views of servo sectors of recording media according to other embodiments of this invention.

It is to be noted that while, in the above-mentioned embodiment, though the information pits $1_1 \sim 1_n$ are formed to follow the format pits $1_{f1}$, $1_{f2}$ in each of the servo sectors, only the information pits $1_1 \sim 1_n$ may be successively formed without providing format pits $1_{f1}$, $1_{f2}$ therebetween, as shown in FIG. 3A. In this case, tracking error information and time base information can be detected by the well known push-pull method.

Figure 3B:
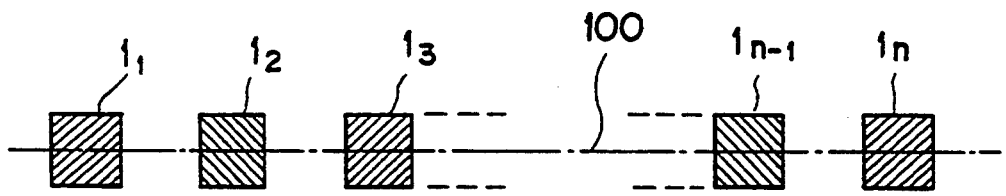

Further, as shown in FIG. 3B, fine diffraction gratings may be formed in rectangular pits.

Figure 4:
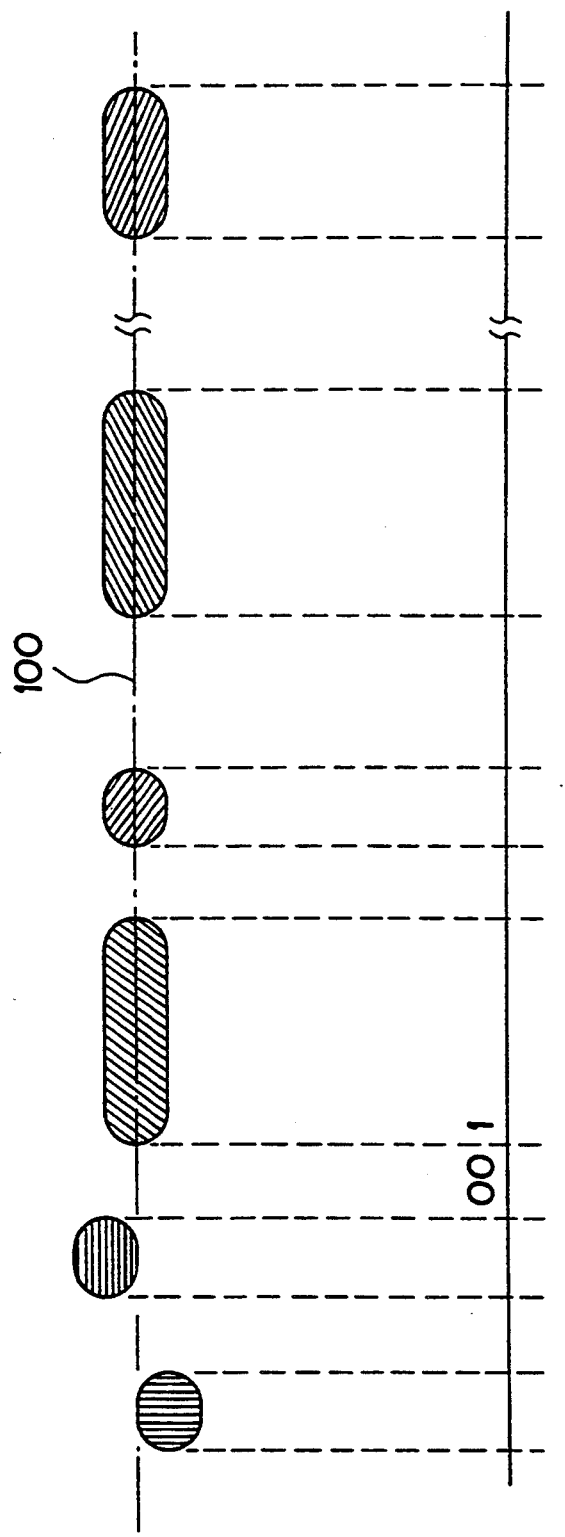
FIG. 4 is an enlarged view of a servo sector of a recording medium according to a still another embodiment of this invention.

In addition, in the above-mentioned embodiment, the format pits $1_{f1}$, $1_{f2}$ and information pits $1_1 \sim 1_n$ are formed by circular pits having the same length in the radial direction of the track 100. However, format pits and information pits may be formed to have different lengths in the radial direction of the track 100, as shown in FIG. 4. In this case, information can be recorded not only as various grating directions of fine diffraction gratings formed in pit regions, but also as various lengths of each pits. Thus, information recording density can be further improved.

Figure 5A:
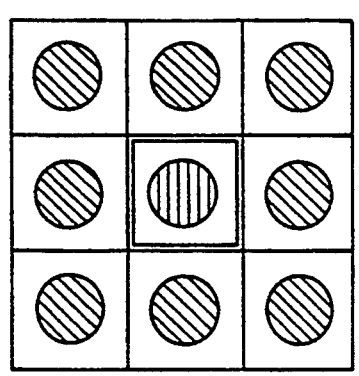
FIG. 5A is a view showing an arrangement of information pits and FIG. 5B is a view showing the diffraction direction of the information pits shown in FIG. 5A.
Figure 5B:
Figure 6:
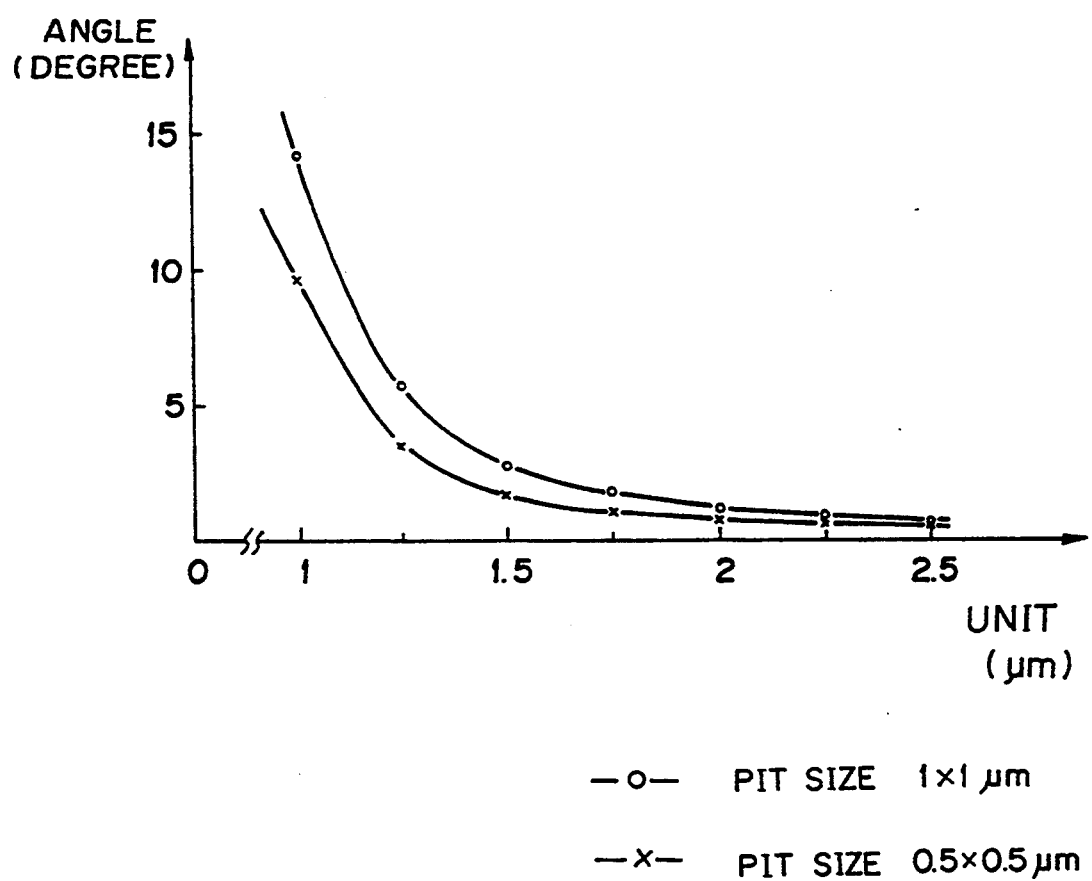
FIG. 6 is a recording density characteristic diagram based on a calculated result for explaining the recording density in the recording media according to this invention.

The recording density of the recording media according to the above-mentioned embodiments will now be described with reference to FIGS. 5A, 5B and 6. When the recording density is calculated with respect to the system in which information is recorded as directions of the elliptically polarized light axis, the directions of the polarized light axis of read-out pits are rotated by some degrees by the influence of adjacent (or neighboring) pits as shown in FIGS. 5A and 5B. If a value twice greater than the above-mentioned rotational angle $\Delta\Theta$ (see FIG. 5B) is below the resolution of angle detection, recorded signals can be properly read.

In the system which utilizes circularly polarized light for the read-out laser beam LB and uses directions of the polarized light axis as information, the rotational angle $\Delta\Theta$ of the polarization axis resulting from the influence of adjacent information pits becomes maximum when the direction of polarization of adjacent 8 pits is shifted by $\pi/4$ with respect to that of the information pit to be read out. The following study will be conducted under such a worst condition.

It is assumed that $\lambda$ is 780 nm, NA is 0.5, and degree of polarization (ratio of length of major axis of the elliptically polarized light axis to that of the minor axis thereof) is 2:1. Further, a small square in FIG. 5A is defined as one unit. Discussion will proceed with the influence of the $\pm$1st order diffracted light produced in this unit being omitted. A rotational angle of the polarization axis based on a calculated result of the recording density with respect to the size of the unit is shown in FIG. 6. In FIG. 6, the X-axis represents a size ($\mu$m) of the unit, and the Y-axis represents a rotational angle (degrees) of the axis of polarization. In this figure, there are shown the cases where the information pit has the size of $1\times 1$ $\mu$m and the size of $0.5\times 0.5$ $\mu$m. As seen from the figure, when the size of unit is increased, influence from adjacent pits is decreased, and accordingly the rotational angle of the polarization axis becomes small. For this reason, if the number of incident directions of a pair of rays of reference light in an information recording apparatus which will be described later (see FIGS. 7 to 10) can be increased, the positional accuracy of the reading laser beam may be lowered, and if the sufficient accuracy of reading angle is ensured, the information density can be improved. When the unit size is 2 $\mu$m and the information pit size is $0.5\times 0.5$ $\mu$m, the rotational angle of the polarization axis resulted from adjacent information pits is equal to $\pm 0.7$ degrees. The direction of the polarization axis can be defined in a range from 0 up to $\pi$. Because $\pi \div (2\times 0.7) = 128.6$, $128(2^7)$ kinds of information can be discriminated. This results in 32 kinds of information in terms of 1 $\mu$m$^2$. Namely, the recording density becomes equal to $5\times 10^6$ bit/mm$^2$. Because an ordinary CD has a recording density of $10^6$ bit/mm$^2$, the recording density reaches a value about five times greater than that of CD.

Information Recording Apparatus

Figure 7:
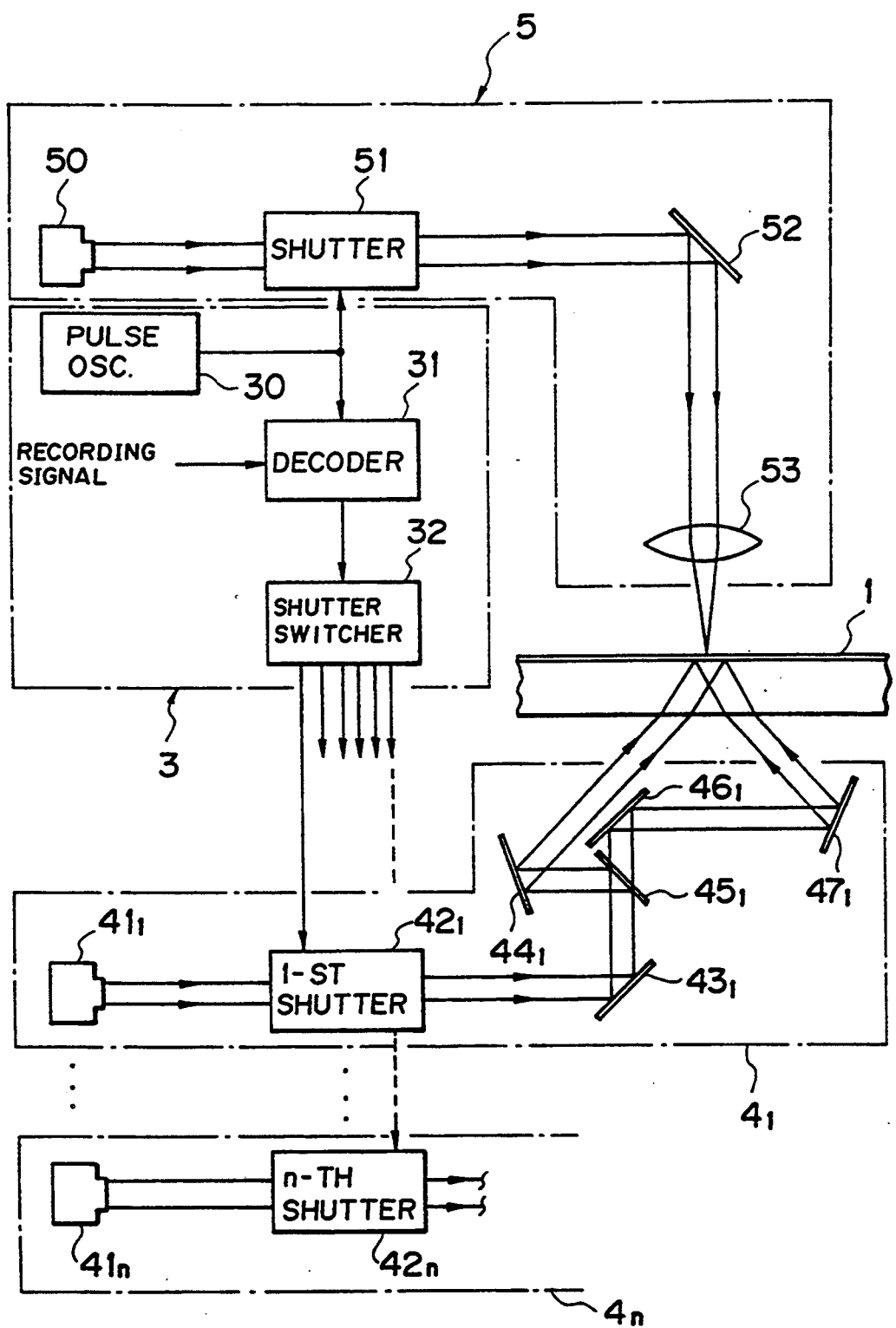
FIG. 7 is a block diagram showing the configuration of an information recording apparatus for a recording medium according to an embodiment of this invention.
Figure 8:
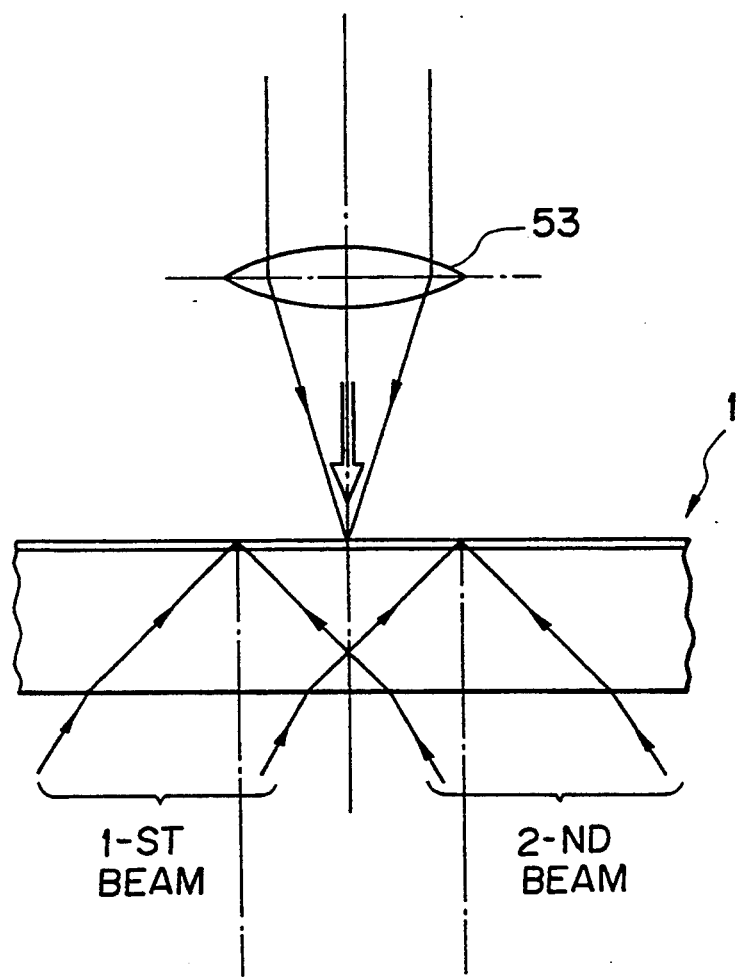
FIG. 8 is a diagram showing the irrradiation manner of reference lights and bias light.
Figure 9:
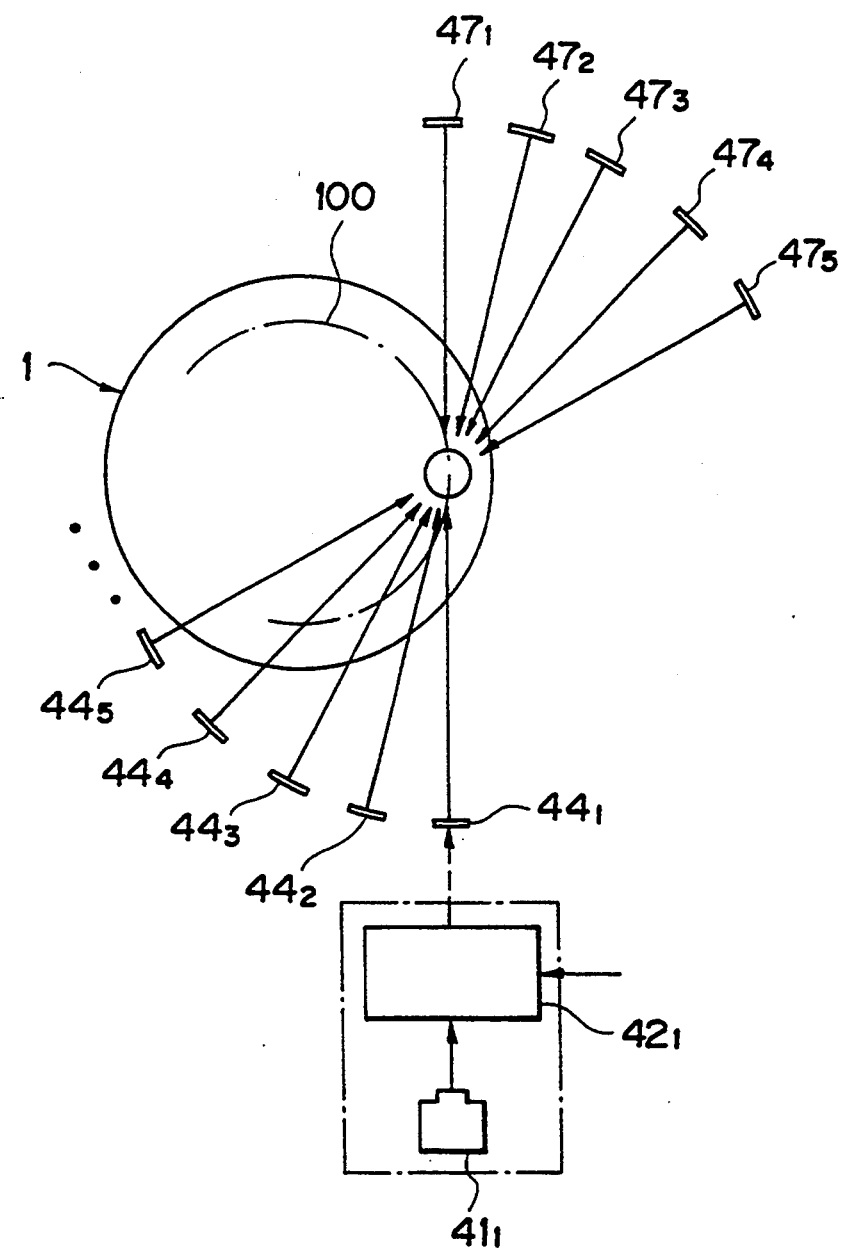
FIG. 9 is a diagram showing a manner of irradiation of reference lights by the reference light emitting device in FIG. 7.
Figure 10:
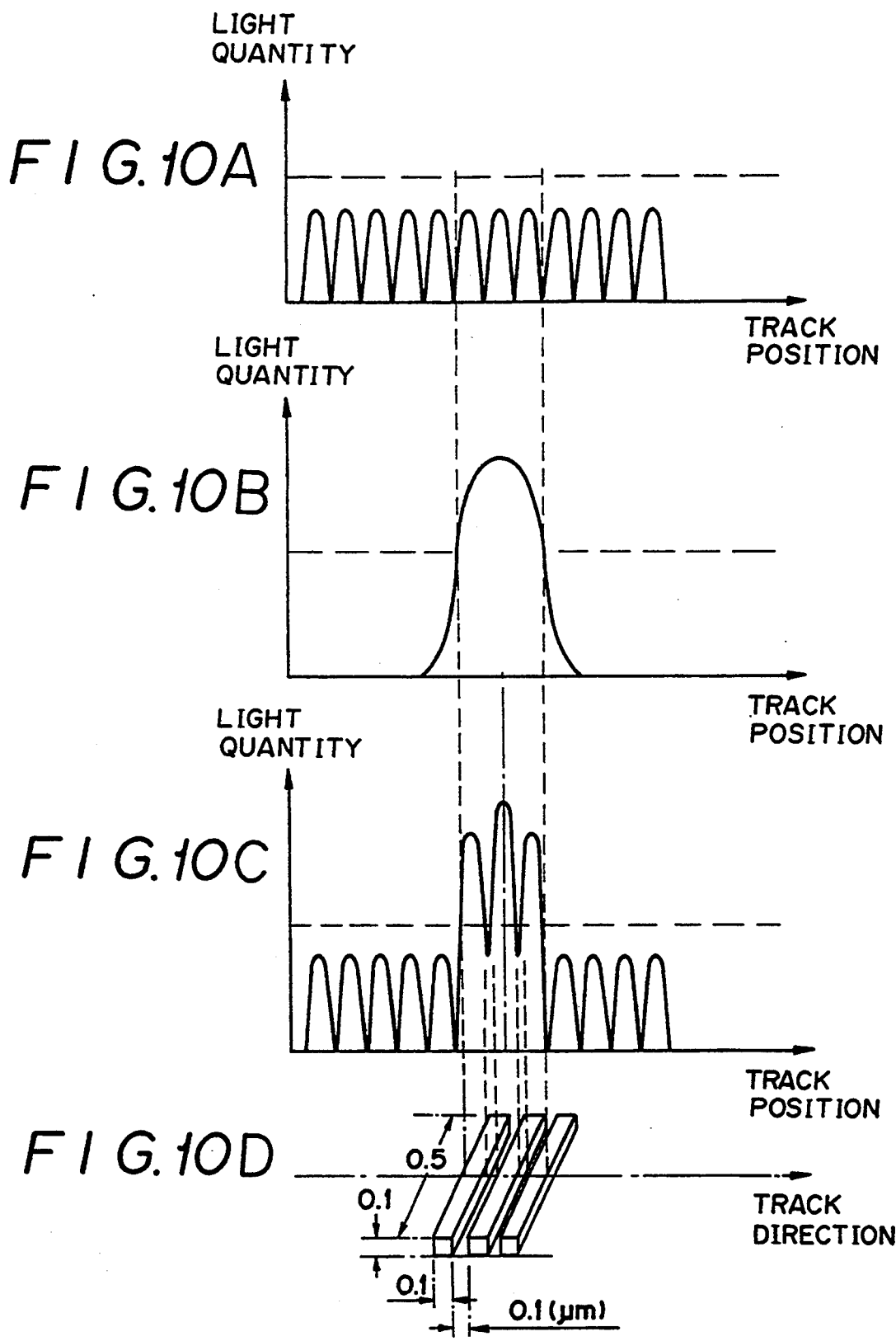
FIGS. 10A–10D are diagrams showing a manner in which rays of reference light and the bias light are emitted and synthesized.

The information recording apparatus according to this embodiment will now be described with reference to FIGS. 7 to 10 wherein FIG. 7 is a block diagram showing the configuration of the apparatus according to this embodiment, FIG. 8 is a view showing the incidence of a light beam, and FIG. 9 is a view showing a manner to emit reference light from the reference light emitting unit in FIG. 7.

As shown in the respective figures, the information recording apparatus according to this embodiment includes a write control unit 3 for outputting a clock signal for writing a recording signal inputted thereto onto an optical disc and a switching signal, reference light emitting units $4_1$ to $4_n$ for irradiating, on the basis of the switching signal, a pair of coherent rays of reference lights on a region of the optical disc 1 which is broader than the region where the single information pit $1_1$ (or $1_2 \sim 1_n$) is to be formed, and a bias light emitting unit 5 for emitting a bias light incoherent with respect to the rays of reference lights onto the same region of the optical disc 1 as the region where the single information pit $1_1$ (or $1_2 \sim 1_n$) is to be formed, to be superimposed on the two rays of reference lights.

The write control unit 3 includes a pulse oscillator 30 for outputting clock signals corresponding to formation intervals of the information pits $1_1 \sim 1_n$, a decoder 31 supplied with those clock signals and a recording signal for generating and outputting a recording control signal, and a shutter switcher 32 for outputting a shutter drive signal for selectively operating any one of the reference light emitting units $4_1 \sim 4_n$ on the basis of the recording control signal.

The reference light emitting unit $4_1$ includes a semiconductor laser $41_1$ for emitting a laser beam serving as a reference light, a first shutter $42_1$ driven by a shutter drive signal outputted from the shutter switcher 32 to transmit a laser beam therethrough, and optical systems $43_1 \sim 47_1$ for branching the laser beam transmitted and emitted into a pair of rays of reference light each incidents on the region where the recording pit $1_1$ (or $1_2 \sim 1_n$) of the optical disc 1 from different directions, respectively. In addition, other reference light emitting units $4_2 \sim 4_n$ are constituted similarly to the reference light emitting unit $4_1$.

The bias light emitting unit 5 includes a semiconductor laser 50 for emitting a laser beam serving as a bias light, a shutter 51 opened and closed on the basis of clock signals outputted from the pulse oscillator 30 to transmits a laser beam therethrough, and optical systems 52, 53 for converging and irradiating, as a bias light, the transmitted laser beam onto the region where the recording pit $1_1$ (or $1_2 \sim 1_n$) of the optical disc 1 is to be formed.

The recording operation of the apparatus of this embodiment thus constructed will now be described. First, in the case of recording information onto an arbitrary track 100 of the optical disc 1, the optical systems 43~47, 52, 53 are moved to the information recording position of the track 100. Subsequently, a recording signal corresponding to record information and the clock signal from the pulse oscillator 30 are inputted to the decoder 31. In response, a recording control signal is outputted from the decoder 31. On the basis of the recording control signal, the shutter switcher 32 outputs, to any one of the first to the n-th shutters $42_1$ to $42_n$, a shutter drive signals for selectively driving and controlling the first to the n-th shutters $42_1$ to $42_n$ in the light emitting units $4_1$ to $4_n$. One of first to n-th shutter $42_1$ to $42_n$ thus selected is driven on the basis of the shutter drive signal to transmit a laser beam emitted from the semiconductor laser $41_1$ to $41_n$ therethrough. This laser beam is branched into two laser beams by using optical systems $43_1 \sim 47_1$ to $43_n \sim 47_n$ so as to be incident, from different directions, on the region on a predetermined track 100 of the optical disc 1 including the region where the information pit 1 is to be formed as rays of reference lights. By irradiating the two rays of reference lights, an interference fringe having a light intensity distribution as shown in FIG. 10A is produced on the predetermined track of the optical disc 1.

In addition, the clock signal outputted from the pulse oscillator 30 is inputted to the shutter 51 of the bias light emitting unit 5. In response, this shutter 51 is driven on the basis of the clock signal so that it is closed or opened to transmit a laser beam from the semiconductor laser 50 therethrough. The laser beam thus obtained is irradiated by the optical systems 52, 53 on the region where the information pit 1 is to be formed as a bias light having a light intensity distribution shown in FIG. 10B.

Since the pair of reference lights and the bias light are irradiated on the same region in a superimposed manner, the light intensity distribution of the interference fringe produced by a pair of reference lights is added to the light intensity distribution of the bias light. The light intensity thus added will exceed a recording threshold energy level of the optical disc 1 as shown in FIG. 10C. Thus, the recording surface on the optical disc 1 is exposed by the interference fringe pattern of the recording energy level to thereby record information onto the optical disc 1. The information thus recorded is formed as a fine diffraction grating in an arbitrary grating direction having a grating constant d less than one half of the wavelength $\lambda$ of the read-out laser beam LB.

Information Recording Method

Figure 11:
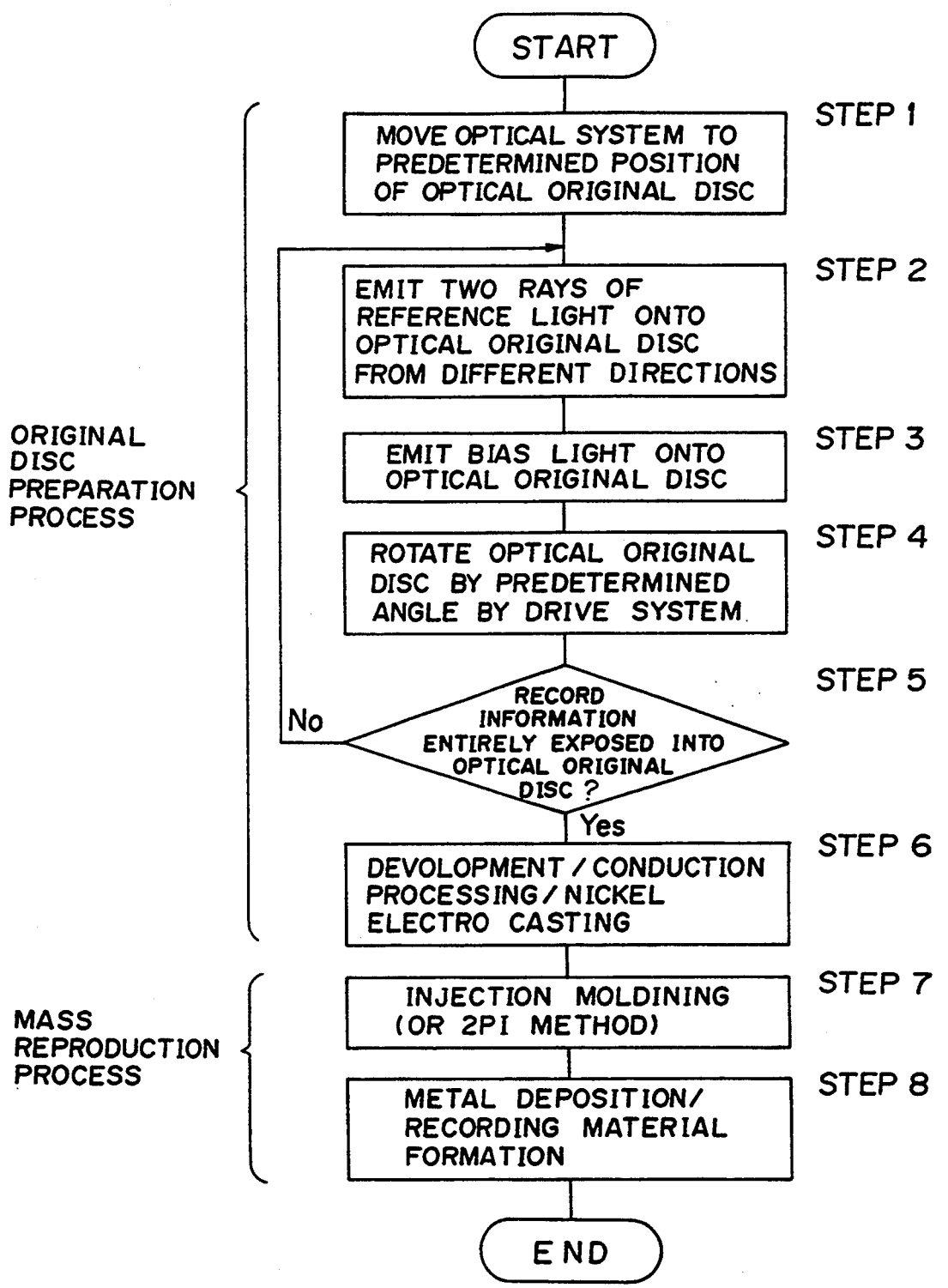
FIG. 11 is a flowchart showing the operation of an information recording method for a recording medium according to the embodiment of this invention.

The information recording method according to this embodiment will now be described with reference to FIGS. 11 to 12. FIG. 11 shows an operation flowchart of the information recording method of this embodiment.

In FIG. 11, the information recording method for a recording medium according to this embodiment includes an original disc preparation process of forming a photoresist of a predetermined height H on a cleaned glass substrate or base to carry out exposure/development processing, or the like, and mass reproduction process for carrying out mass reproduction of optical discs from the prepared original optical disc. Particularly, the exposure processing in the original disc preparation process is different from that of the prior art.

In the original disc preparation process, first, an optical system for exposure processing is moved to a predetermined position of an original optical disc having a glass substrate on which photoresist is coated in step 1. Then, a pair of coherent rays of reference lights is irradiated from the optical system on a region broader than the region where information pits are to be formed from one side surface of the original optical disc to produce an interference fringe having a bright line (or dark line) interval d less than one half of the wavelength $\lambda$ of the read-out laser beam used in reproduction (see FIG. 10A) in step 2. Then, under the state where rays of reference lights are irradiated, a bias light incoherent with respect to the rays of reference lights is irradiated, from the other side surface of the original optical disc, on the region substantially equal to the region where single information pit is to be formed (see FIG. 10B) in step 3. As a result, the light intensity distribution of the interference fringe produced by the pair of rays of reference exceeds the recording threshold energy level by the superimposition of the bias light (see FIG. 10C).

The exposure operation of the single information pit is completed by steps 2 and 3. Then, the original optical disc is rotated by a predetermined angle by means of the drive system in order to form other information pits in step 4. It is judged whether or not all of the record information are exposed on the original optical disc as corresponding information pits in step 5. If the judgment in step 5 results in NO, the operation returns to step 2 to repeat operations of step 2 to step 5. In contrast, if the judgement in step 5 results in YES, the original optical disc is developed to carry out conduction processing thereafter to implement nickel electrocasting, thus to complete preparation of a nickel stamper of the original optical disc having information pits formed with fine diffraction gratings in step 6.

In the subsequent mass reproduction process, injection molding of plastic is carried out by means of the nickel stamper of the original optical disc in step 7, and metal film deposition or formation of a recording material is executed in step 8. As a result, an optical disc 1 on which information is recorded as information pits of fine diffraction gratings having an interval d less than one half of the wavelength $\lambda$ of the read-out laser beam as a grating constant. For the metal film deposition, it is desirable to use metal, e.g., Au, etc. so that the angle of polarization of a signal light obtained in reproduction of the optical disc 1 becomes large. Further, in the above-mentioned step 7, molding may be conducted by so-called 2P process in which Photo Polymer is used to irradiate ultraviolet ray from the substrate or base (glass or plastic) side of the optical disc 1.

It is to be noted that the pair of reference lights and the bias light may be respectively irradiated from same side of the glass substrate constituting the original optical disc, or alternatively, a pair of reference lights are irradiated from one side of the surface of the glass substrate and a bias light is irradiated from the other side of the surface.

Information Reproducing Apparatus

An optical pick-up which serves as an information reproducing apparatus according to this embodiment will now be described with reference to FIGS. 12 to 15. FIG. 12 is a diagram showing the configuration of a read-out system of the optical pick-up of this embodiment. The optical pick-up according to this embodiment includes a semiconductor laser 61 for emitting a circularly polarized read-out laser beam having a wavelength $\lambda$, an optical system 6 for irradiating circularly polarized read-out laser beam emitted from the semiconductor laser 61 onto the optical disc 1 which has information pits formed by fine diffraction gratings having a grating constant d less than one half of the wavelength $\lambda$ of the read-out laser beam, and for emitting a signal light reflected or double-refracted from the optical disc 1 in a direction different from the optical path of the read-out laser beam, a half-mirror 70 for branching the signal light emitted from the optical system 6 into two rays of signal light, first and second polarization beam splitters 71, 74 for branching rays of signal light branched by the half-mirror 70 into two polarized light components, respectively, converging lenses 72a, 72b, 75a, 75b for converging rays of signal light of respective polarized light components branched and forming images thereof, and first to fourth photo-detectors (PD) 73a, 73b, 76a, 76b arranged on focal plane surfaces of the respective converging lenses 72a, 72b, 75a, 75b and adapted to receive rays of signal light of respective polarized light components to apply photo-electric conversion thereto to output electric RF signals.

The optical system 6 includes a collimator lens 62 for changing the plane polarized read-out laser beam to a parallel light, a quarter wave length plate 63 for changing this read-out laser beam of parallel light to a circularly polarized read-out laser beam, a beam splitter 64 for separating the read-out laser beam and a signal light from the optical disc 1, and a converging lens 65 for converging and irradiating the read-out laser beam from the beam splitter 64 onto the recording surface of the optical disc 1.

In this embodiment, the first and the second polarization beam splitters 71, 74 are arranged with respective optical axes being inclined by 45 degrees with respect to the optical axis of the incident signal light. Rays of elliptically polarized signal light from these splitters are irradiated in polarized states as indicated by solid lines and dotted lines in FIG. 13. Since it is impossible to discriminate, only by using photo-detectors 73a, 73b, whether rays of irradiated light are signal lights polarized as indicated by the solid lines or signal lights polarized as indicated by the dotted lines, as shown in FIG. 12, detection signals from the photo-detectors 76a, 76b are compared so as to determine the direction of the polarization axis of signal lights in respective polarized states indicated by the solid lines and dotted lines. In this figure, arrows 73a', 73b', 76a' and 76b' represent output levels of detection signals outputted in correspondence with photodetectors 73a, 73b, 76a and 76b, respectively.

By detecting angles $\Theta_1$, $\Theta_2 \sim \Theta_n$ of the polarization axis in this way, it is possible to reproduce information recorded as of information pits of fine diffraction gratings.

Figure 14:
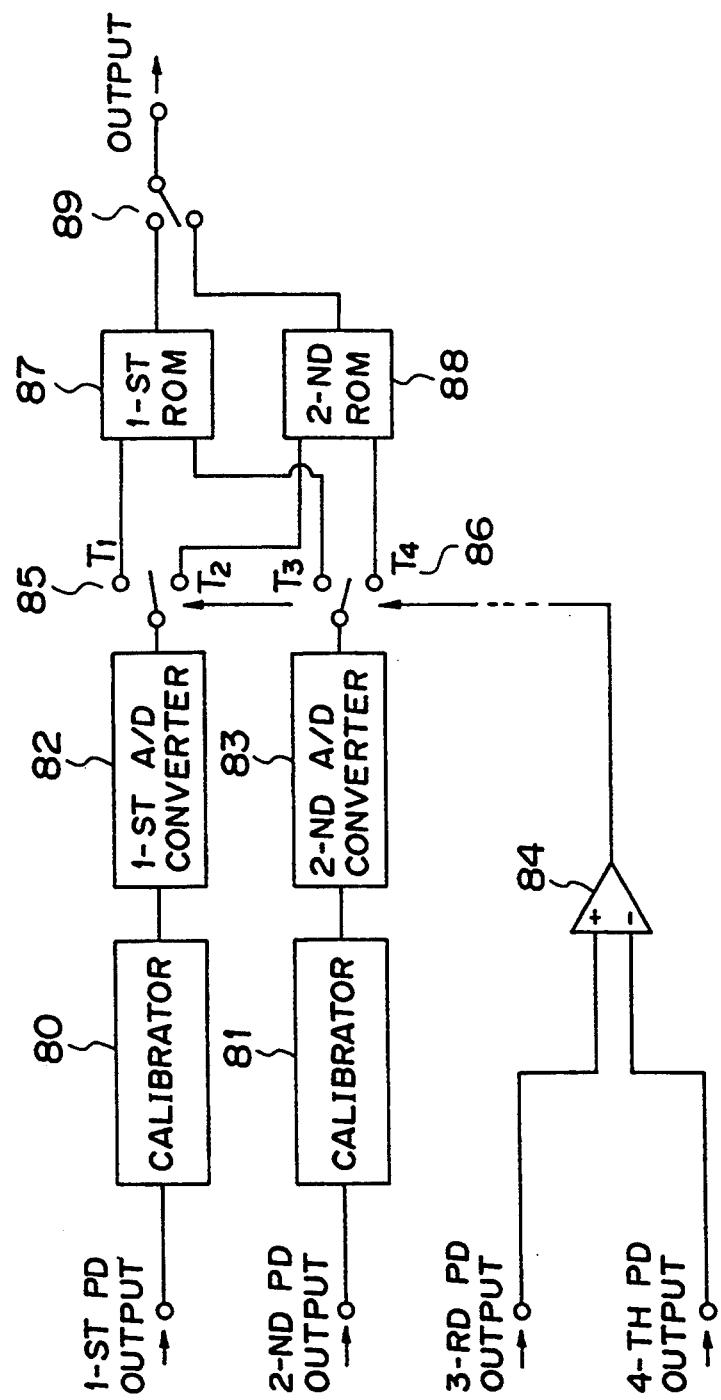
FIG. 14 is a block diagram showing the configuration of a reproduced signal processing device.

The transform operation from the detected angles $\Theta_1 \sim \Theta_n$ of the polarization axis to recorded information will now be described with reference to FIG. 14. FIG. 14 is a block diagram showing the configuration of a reproduced signal processing device.

In this figure, the reproduced signal processing device is of a structure including first and second ROMs 87, 88 in which binary information corresponding to various patterns (directions) of fine diffraction gratings in information pits $1_1 \sim 1_n$ formed on the optical disc 1 are stored in advance. The first and second ROMs 87, 88 receive detection signals of respective first to fourth PDs 73a, 73b, 76a and 76b (see FIG. 13) as an address signal and read out stored binary information specified by the address from the first or second ROM 87, 88.

In order to produce address signals for specifying addresses of the first and second ROMs 87, 88, from the detection signals from the first to fourth PDs 73a, 73b, 76a and 76b, calibrators 80, 81 adjusts the signal level of the detection signals of respective polarized components outputted from the first and second PDs 73a and 73b. Then, detection signals in an analog form outputted from the respective calibrators 80, 81 are converted to digital signals by first and second A/D converters 82, 83. These digitized detection signals are supplied to the first and second ROMs 87, 88 as address signals.

Further, a difference between detection signals of respective polarized light components outputted from the third and fourth PDs 76a and 76b (see FIG. 12) is calculated by a subtracter 84 to output it as a detection difference signal for judgment of polarity. On the basis of the detection difference signal, respective outputs of the first and second A/D converters 82, 83 are switched and supplied to the first or second terminal $T_1$ or $T_2$, or to the third or fourth terminal$_3$ or $T_4$ by the first and second switches 85, 86. Thus, the detection signal outputted from the first or third terminal $T_1$ or $T_3$ is inputted to the first ROM 87, and the detection signal outputted from the second or fourth terminal $T_2$ or $T_4$ is inputted to the second ROM 88.

Binary information read out from the first or second ROM 87 or 88 is supplied to a single output line on the basis of the switching operation of a switch 89.

Figure 15:
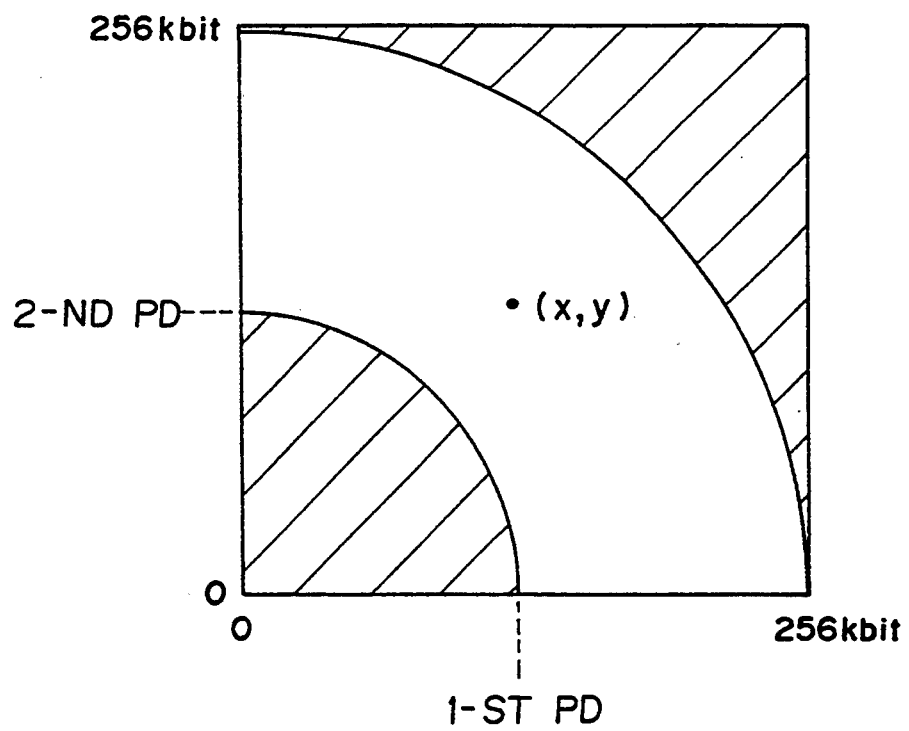
FIG. 15 is a conceptual diagram of address areas in first and second ROMs of the apparatus shown in FIG. 14.

Regarding the relationship between the first and second A/D converters 82, 83 and the first and second ROMs 87, 88, in the case where, e.g., the number of conversion bits of the A/D converters 82, 83 is 8 bits, the memory capacity of the first and second ROMs 87, 88 is required to be about 256K bits or more. The conceptual diagram of the address region of the ROMs in the case of this example is shown in FIG. 15. In FIG. 15, when the value subjected to A/D conversion of the first PD 73a is assumed as "X" address, and the value subjected to A/D conversion of the second PD 73b is assumed as "Y" address, address data of the first ROM 87 or the second ROM 88 is represented by (X,Y). When the first and second ROMs 87, 88 are accessed on the basis of the address as described above, the polarization axis angle of 45 degrees is obtained at the address (128, 128), for example. From this angle data, corresponding information can be specified.

Meanwhile, when there is any change in a light quantity of a signal light from the optical disc, both addresses X, Y outputted from the first and second A/D converters 82,83 simultaneously vary at a fixed rate. However, in the system of reading out only the polarization axis, an address change of a fixed rate resulting from a change of the light quantity is eliminated by correction of the light quantity by the first and second A/D converters 82, 83. Thus, an angle value of a polarization angle obtained is not changed. In actual terms, in the system, correction of angle and correction of light quantity by the A/D converters are carried out by the format pits $1_{f1}$ and $1_{f2}$ shown in FIG. 2. Although the dynamic ranges of the first and second A/D converters 82, 83 are not shown, it is sufficient that the gains of the outputs from the first and second PD 73a, 73b inputted to the calibrators 80, 81 are adjusted so that the data ranging from 128 to 256K bits which is nearly one half of the range from 1 to 256K bits is effective. As the result of such adjustment, the angular error in the A/D conversion by the first and second A/D converters 82, 83 is about 0.30 degrees at the address (0, 192), and is about 0.15 degrees at the address (192, 192).

Further, the portions indicated by slating lines in FIG. 15 are not used because the portion indicates the case where output gains (the first PD 73a+the second PD 73b) is less than 1 at the time of read-out of signals, and the previously described gain adjustment is carried out.

If calibration of the light quantity can be sufficiently conducted by using the above-mentioned format pits $1_{f1}$, $1_{f2}$, the recording density can be further increased several times. In order to actually vary the light quantity, there may be a method of varying the degree of polarization. Namely, a method of varying the pitch or height of the grating may be adopted for this purpose.

It is to be noted that while, in the embodiment shown in FIG. 14, the binary information is selectively read out from two memory sections of the first and second ROMs 87, 88, only one ROM may be employed to store the binary information on the basis of detection signals from the first and second A/D converters 82, 83.

As is clear from the foregoing description, in accordance with the recording medium of this invention, pit regions of information pits are formed by fine diffraction gratings having a grating constant less than one half of the wavelength λ of the read-out light to allow the fine diffraction gratings to have plural kinds of grating directions corresponding to information to be recorded. Accordingly, it is possible to make a plurality of information contents in the same pit region of information pits. Thus, high density integration of information can be advantageously realized.

Further, in accordance with the information recording apparatus and the method of this invention, coherent two rays of reference light are incident on a pit region forming information pits, and a bias light is incident thereon to be superimposed on the two rays of reference light. Thus, the light intensity distribution of the interference fringe by two rays of reference light and the light intensity distribution of the bias light are added. As a result, the light intensity distribution of the interference fringe exceeds the recording energy level of the recording medium. Thus, fine diffraction gratings of information pits corresponding to a plurality of information contents can be formed in the same pit region at high density and with high accuracy.

In addition, in accordance with the information reproducing apparatus of this invention, a read-out light having a wavelength λ is irradiated on a recording medium on which information are stored by information pits of fine diffraction gratings having a grating constant less than one half of the wavelength λ of the read-out light. A signal light double-refracted from the recording medium is branched into two signal lights. One branched signal light is splitted into respective polarized light components by using a first polarization beam splitter, and the other branched signal light is splitted into respective polarized light components by using a second polarization beam splitter whose optical axis is inclined to the optical axis of the first polarization beam splitter. By using first to fourth photo-detectors, signal lights of respective polarized light components branched by the first and second polarization beam splitters are outputted as reproduced signals. Thus, reproduction of information from the recording medium on which information are stored at high density can be advantageously carried out in an accurate manner.

What is claimed is:

1. An information reproducing apparatus for reproducing recorded information from a recording medium on which information pits are formed by fine diffraction gratings having a grating constant (d) of an interval less than one half of the wavelength (λ) of a read-out light, comprising:

a light source for emitting the read-out light;

an optical system for irradiating the read-out light emitted from said light source onto the recording medium in a first optical path and for guiding a signal light double-refracted from the recording medium in a second optical path different from the first optical path;

branching means for branching the signal light in the second optical path into two rays of signal light;

a first polarization beam splitter for receiving one of the two rays of signal light and splitting the received signal light into two polarized light components;

a second polarization beam splitter for receiving the other one of the two rays of signal light and splitting the received signal light into two polarized light components, an optical axis of said second polarization beam splitter being inclined at a predetermined angle with respect to an optical axis of the first polarization beam splitter; and first to fourth photo-detectors for receiving the polarized light components of said first and second polarization beam splitters and outputting reproduced signals.

2. An information reproducing apparatus according to claim 1, wherein said predetermined angle comprises 90 degrees.

3. An information reproducing apparatus according to claim 1, further comprising converting means for converting said reproduced signal output from said photo-detectors to the corresponding recorded information.

4. An information reproducing apparatus according to claim 2, wherein said converting means comprises memory means for storing information of correspondence between said reproduced signal and said recorded information.

* * * * *